June 14, 1960
F. A. NEMEC ET AL
2,940,435
DUAL FUEL SYSTEM
Filed March 7, 1957
2 Sheets-Sheet 1
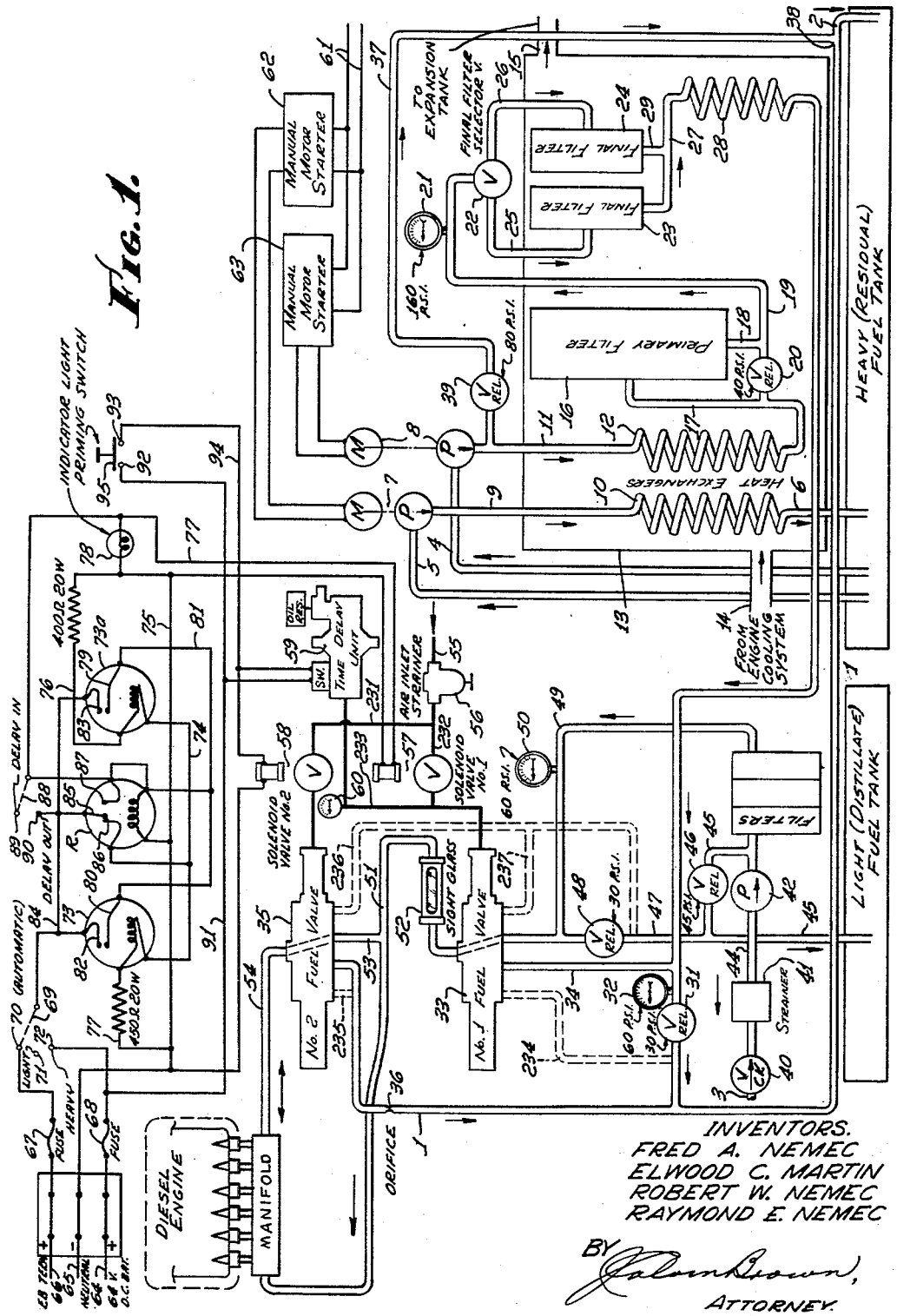
INVENTORS.
FRED A. NEMEC
ELWOOD C. MARTIN
ROBERT W. NEMEC
RAYMOND E. NEMEC
BY
*Galvin Brown*,
ATTORNEY.

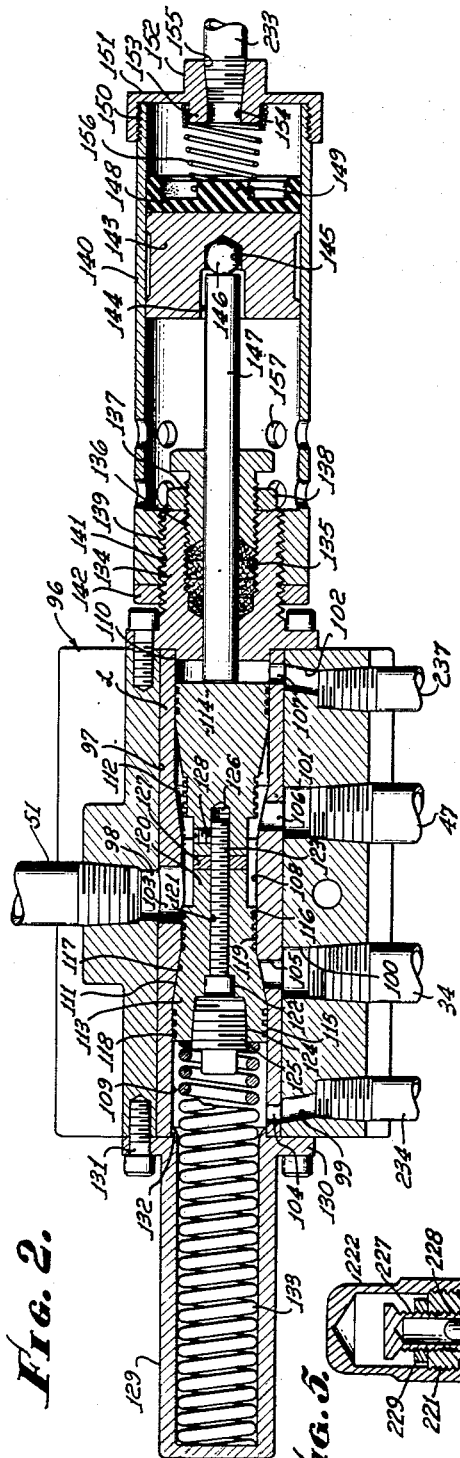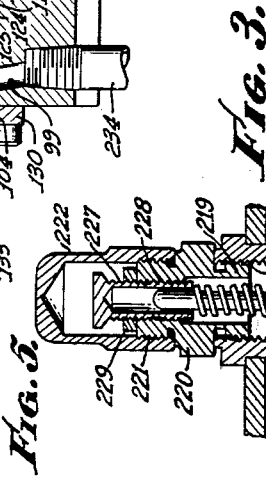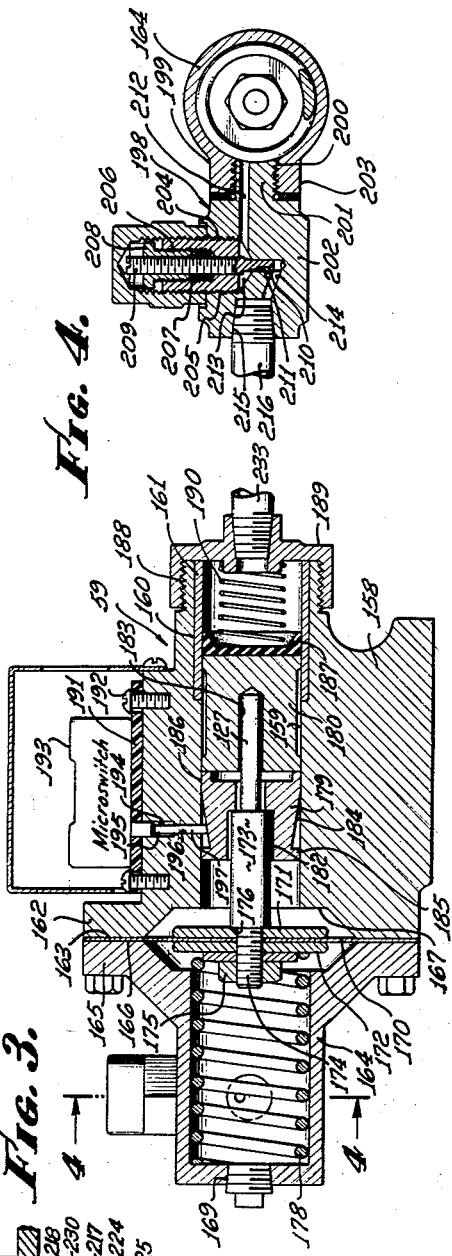
INVENTORS.
FRED A. NEMEC
ELWOOD C. MARTIN
ROBERT W. NEMEC
RAYMOND E. NEMEC
BY
ATTORNEY.

United States Patent Office 2,940,435
    Patented June 14, 1960

2,940,435

DUAL FUEL SYSTEM

Fred A. Nemec, 9030 Colima Road, Whittier, Calif.; Elwood C. Martin, 32 Harbor Island, Newport Beach, Calif.; and Robert W. Nemec, 9600 La Alba Drive, and Raymond E. Nemec, 8933 Colima Road, both of Whittier, Calif.

Filed Mar. 7, 1957, Ser. No. 644,687

18 Claims. (Cl. 123—139)

The present invention relates to a dual fuel system for Diesel engines wherever such a system would prove advantageous and economy of operation would result.

The dual fuel system of the invention has been found to be of use for marine Diesels, Diesel tractors, so-called stationary Diesels, and in Diesel locomotives. It has been determined that in the case of railroads, that railroad fuel alone accounts for about 50% of locomotive operating expense and, accordingly, a system which permits the railroad to cut its fuel bills from 1½ to 2 cents per gallon will, in the aggregate, result in a saving financially to the railroad.

Actual experience has dictated that a residual fuel, such as Bunker C and blends of residuum and distillate oils, hereinafter referred to as residual fuels, cannot be used for starting Diesel engines, or while the said engine is idling, without great damage to the engine after a period of time. As a consequence, residual fuels of the type mentioned are generally used after the engine is delivering a certain horsepower or revolving at a given speed, under load. When residual fuels are used throughout the range of the engine, that is, from starting to its highest speed or horsepower, injection difficulties result at the low speeds or idling, due to the high viscosity of the residual fuel, and the high corrosive factors of this fuel at low engine temperatures have a deleterious effect on the engine, and particularly the cylinder liners and piston rings. This is due to a large number of contaminants in residual fuel which include sulphur and derivatives thereof, such as sulphuric acid, and the formation of hard carbon cones or horns at the engine injector tips. Quite obviously, the cost of overhauling a Diesel engine and its reduced availability resulting from the use of residual fuels at low speeds is so high as to cause the railroads to utilize a higher grade fuel to overcome the difficulties mentioned. In other words, it is more economical for the railroads to use a distillate fuel than to stand the cost of an overhaul through the use of a residual fuel for the low speeds. However, a railroad engine, or other Diesel engine, will not idle properly, nor will it deliver peak performance at low operating speeds or loads with a residual fuel irrespective of the damage that such a fuel causes the engine. Accordingly, it is proposed to utilize a high grade fuel, such as a distillate, for low engine speeds and loads and at idling and starting, and then to transfer to a residual fuel after the engine is delivering a selected horsepower and is operating under a load. To effect economical operation of such a Diesel engine, it is obvious that the high grade fuel should not be utilized for a longer period than is absolutely necessary for the obtaining of peak efficiency in the engine operation. However, it is essential that the residual fuels should be conditioned for use in the engine. The viscosity of a residual fuel, such as Bunker C, is so high that at ordinary temperatures, it practically will not flow and, accordingly, this residual fuel must be heated. The present invention provides a means whereby the residual fuel is heated by utilizing a heat exchanger in connection with the engine water jacket, which water is used for cooling the engine. Other sources of heat may be utilized, such as the exhaust stack or electric heaters. It has been found that Bunker C blended residual (viscosity of 300 SSU at 100° F.) when heated to 160° F., has an injection viscosity of around 80 SSU. As standard distillate fuel has a B.t.u. content of 140,000, the gravity being 36°, while a 13.5° API gravity residual has 150,000 B.t.u. per gallon, there is a possible increase in per gallon mileage through the use of the high B.t.u. content residual fuel over standard distillate of about 7.2%. Accordingly, then, the problem is to utilize a high grade fuel, such as a distillate, for starting, idling, and for certain load conditions, and thereafter to automatically transfer to a heated residual fuel for the remaining speeds and horsepower of the engine.

An object of the present invention is primarily to effect economies in Diesel engine operation so far as fuel is a factor, by the utilization of a dual fuel system which, when used in accordance with the present invention, results in efficient engine operation throughout the operating range of said engine.

A further object is to provide efficient means for automatically changing from one fuel to another fuel in accordance with the operating conditions of the engine.

A further object is to provide a system and means whereby use of a heavy residual fuel may be discontinued and a distillate fuel used, and vice versa, without any intermingling or contamination of the content of the light fuel tank by heavy fuel.

A further object is the provision of a system and means adapted to automatically enable a Diesel engine to operate a majority of its working cycle on a low grade, economical fuel.

A further object is a dual fuel system for Diesel engines which so functions during a change from residual or low grade fuel to high grade fuel, such as a distillate, which purges the injector manifolds of the engine and intermediate feed lines of all low grade or residual fuel prior to receiving the high grade or distillate fuel, to the end that the engine does not have any intermixing between the fuels, particularly when the engine is idling.

A further object is the provision of a system and means utilizing dual fuel for a Diesel engine, which is adaptable to either manual or automatic operation and wherein there is incorporated means which is foolproof in operation, not critical, and parts which, when once adjusted, will retain adjustment. Particularly, the system and means does not require constant attention by an engineer to determine whether or not the system and means is functioning properly. All controls for the system of the present invention are so arranged that the engineer may easily observe the same and any likelihood of break down is reduced to a minimum.

With the above and other objects in view, the invention consists in the novel and useful provision, formation, construction, association, and relative arrangement of parts, members and features, all detailed in the drawings, described generally, and more particularly pointed out in the claims.

In the drawings:

Figure 1 is a schematic piping arrangement together with parts and members utilized in the dual fuel system of the present invention, Figure 2 is a fragmentary, longitudinal sectional view of selector valves utilized in the present invention, Figure 3 is an enlarged sectional view of a time delay unit used in the present invention, Figure 4 is a transverse sectional view on the line 4—4 of Figure 3, and, Figure 5 is a sectional view of a filter relief valve utilized in the invention.

Referring now with particularity to the drawings, the basic dual fuel system is shown diagrammatically in Figure 1, while certain apparatus and means utilized in said system is detailed in the remaining figures. Initially, the various parts entering into the diagrammatic showing in Figure 1 bear notations to give a clear understanding of the members utilized in the system. When considering the dual fuel system for use in locomotive, marine and stationary diesels, it is apparent that certain refinements of detail may be resorted to, in accordance with the particular type of engine involved. By this, we mean that a high grade or distillate fuel tank must be provided and likewise a residual or low grade fuel tank. These tanks may be separate, or in the form of one large tank with a divider or partition wall separating and forming two compartments, one for high grade fuel and one for low grade fuel. It has been found expedient to treat the exterior surface of the fuel tanks with some heat resistant coating, as the system to be described requires a heat treating of the residual fuel so that its viscosity is lowered to permit the same to flow. Thus, in Figure 1, there is a piping 1 which leads at 2 to the residual or heavy fuel tank, while the piping at 3 leads to the distillate or high grade fuel tank. 2 also represents the outlet to the heavy fuel tank while the pipes at 4 and 5 constitute the inlets from the heavy fuel tank. Thus, two lines, such as 4 and 5, serve to conduct the residual fuel from the residual fuel tank to the various elements of the system, while the pipe 2 acts to return the heavy fuel to said tank. In addition to the foregoing, there is a pipe 6 which discharges to the heavy fuel tank. Thus, we have two pairs of inlet and outlet pipes communicating with the heavy fuel tank.

To describe the heavy fuel system, the pipes 4 and 5, which constitute the inlet pipes to the system of Figure 1, each includes therein a motor driven pump which constitute heavy fuel circulating pump 7 and fuel supply pump 8. The circulating motor and pump at 7 communicate with a piping 9 leading to heat exchanger 10, while the combination motor-pump at 8 leads to piping 11 and heat exchanger 12. The heat exchangers, in the present instance, are shown as being helical piping, and the heat exchangers are confined within a tank 13. The tank 13 has an inlet at 14 and an outlet at 15. The inlet of the tank is in communication with a diesel engine water-jacket while the outlet leads to an expansion tank. The outlet of the heat exchanger 10 is in direct communication with the pipe 6 which, as previously stated, discharges to the heavy fuel tank, while the outlet for the heat exchanger 12 is in communication with a primary filter 16 by means of piping 17. The outlet piping 18 from the primary filter connects with piping 19, which piping communicates with piping 17, there being a relief valve 20 included in said piping 19 between piping 17 and 18. There is a pressure gage 21 included in the piping 19, the said piping leading to a final filter selector valve 22. Two separate final filters 23 and 24 are within the tank 13 and pipes 25 and 26 lead from the selector valve 22 to the inlets for the said filters 23 and 24, while piping 27 and 29 leads from the outlets of filters 23 and 24 to a heat exchanger 28. The heat exchanger 28 is identical in construction to the heat exchangers shown at 10 and 12, and the outlet pipe 30 from said heat exchanger extends outwardly of the tank 13 to a relief valve 31 and through said relief valve the said piping connects with the pipe 1. A pressure gage 32 connects with the pipe 30 adjacent the intake for the relief valve 31. At 33, we have provided a means which we designated as No. 1 fuel valve, which fuel valve is detailed as to construction in Figure 2 and will be described later. Preliminarily, the No. 1 fuel valve is designated as an inlet fuel selector valve, and as shown in the diagram, a pipe 34 is in communication with pipe 30 and a port in the said fuel valve 33. A further fuel valve is provided at 35 which is identical in construction with the fuel valve 33, and the pipe 1 communicates with a port in said valve. Fuel valve No. 2 at 35 is commonly referred to hereafter as a return fuel selector valve. Included within the pipe 1 is an orifice 36. A piping 37 communicates with piping 1 at 38 for one end thereof, while the opposite end thereof is in communication with piping 11. Included within said piping 37 between the piping 11 and its connection with the piping 2 is a relief valve 39.

The distillate or high grade fuel system has its connection with the distillate tank through pipe 3 which leads to check valve 40, a strainer 41, a distillate fuel pump 42, and a series of filters, designated generally as 43. The piping in this connection between the check valve, strainer, and the pump is designated as 44. Piping 45 communicates with piping 44 between the pump 42 and the filters 43, said piping including a relief valve 46, the said piping returning to the light fuel tank. Beyond the relief valve 46 is piping 47 which includes within its length a relief valve 48, the piping terminating in a port of the No. 1 fuel valve 33. Piping 49 communicates with the piping 47 between the relief valve 48 and the fuel valve 33, and with the filter unit 43. Piping 49 includes within its length a pressure gage 50. Piping 51 communicates with a port in fuel valve 33 and with the engine manifold, said piping including within its length a sight glass 52, and piping 53 communicates with said piping 51 and with a port in fuel valve 35. Piping 54 communicates with a port in fuel valve 35 and with the engine manifold or header.

In the present instance, the fuel valves 33 and 35 are air operated, and air under pressure has its inlet at 55 through a strainer 56, with an electro-pneumatic solenoid valve 57, and through said solenoid valve with fuel valve No. 1, shown at 33. Between the solenoid valve 57 and strainer 56 the air is allowed to pass under control of an electro-pneumatic solenoid valve 58 to fuel valve No. 2, shown at 35. The air under pressure is also directed to a time delay unit, designated as 59, and which unit is detailed in Figures 3 and 4. The air path to the time delay unit is included in the circuit interposed between fuel valve 33 and the solenoid valve 57. This circuit includes, in the present instance, a gage 60. The solenoid valves 57 and 58 each have a bleed port that opens when the valves are closed to pressure air.

Electrical circuits are used for energizing not only the several motors connected with pumps but for the solenoid units as well, and electrical wiring, shown at 61, connects with a source of power, in this instance, preferably a 64-volt D.C. battery circuit, with manual motor starters 62 and 63, which motor starters are electrically connected with the motor pump combinations at 7 and 8. A 64-volt D.C. battery circuit is provided at 64, which is a positive circuit while a negative circuit is provided at 65, and a further positive circuit at 66. Circuits 64 and 66 are passed through fuses 67 and 68, with a switching arrangement at 69 which is for automatic operation of the dual fuel system when at contact 70 and which passes light or distillate fuel only when the switch is at contact 71 and heavy fuel only when at contact 72. The switch arm of the switching circuit 69 connects through suitable leads with a relay R and with a pair of time delay switches 73 and 73a. It will be observed that the heater elements of switches 73 and 73a are connected by wire 74 and by a wire 75 in circuit with wires which include resistances, as shown at 76 and 77. The wire 76 is in circuit with the solenoid valve 57 while wire 77 leads from said solenoid valve to a terminal of relay R. An indicator light 78 is connected between wires 76 and 77. The elements 79 and 80 of switches 73 and 73a are interconnected by wire 81, and the switching elements 82 and 83 are interconnected by wire 84. The coil of relay R has one terminal connected to wire 75 and the opposite terminal to wire 81. The switch arm 85 of the relay R connects to wire 84, while switch terminals 86 and 87 are connected to wires 74 and 81, respectively. Switch terminal 87 is connected to wire 77 and with a manually operated switch designated generally as 88, wherein contact 89 is known as the delay IN contact, and contact 90 as the delay OUT contact, either contact to be engaged by a switch arm. As shown, there is a connection 91 between line 64 and a contact 92. A further contact 93, of a manually operated switch, through connection 94, is in circuit with the time delay unit 59 and with the solenoid valve 58 and thence to line 65. The switching element for contacts 92 and 93 is designated as 95, and this particular switch is known as the PRIMING switch. When the system is used in conjunction with a Diesel locomotive, the line 66 connects with a single pole-single throw switch in the engine governor mechanism, or with a pressure switch in the air line from an automatic governor, or from some switch on the throttle lever. So far as the time delay switches 73 and 73ª are concerned, these are of the heater bi-metallic type, in which the armatures are caused to contact or separate, in accordance with the heat generated by the heating coil in each thereof. The relay R has its armature or switch arm 85 moving between two contacts 86 and 87, being actuated to move by the magnetic coil within the same.

In order to fully understand the invention, the structure of the fuel valves No. 1 and No. 2, shown at 33 and 35, will be described, followed by a description of the time delay unit at 59, as well as a description of other elements entering into the various structures utilized in the practice of the invention.

Referring to Figure 2, a casing or body 96 is provided with a cylindrical bore 97 and with an intermediate transverse bore 98 which forms a port while a diametrically opposite portion of said casing is provided with four spaced apart bores or ports 99, 100, 101, 102. It will be observed that bore 98 is diametrically intermediate bores 100 and 101. All of said bores aforesaid are counterbored to provide tapered screw-threaded portions for reception of threaded ends of fittings or pipes which communicate with said bores or ports, as hereinafter set forth. For instance, the pipes 47 and 53 of the fuel valves at 33 and 35 respectively communicate with the ports 101, as shown in Figure 1, while the pipes 51 and 54 of said valves are in communication with the ports 98. Within the cylindrical bore 97 is a liner or sleeve L. This liner has a cylindrical outer surface which fits closely within the bore 97 and is provided with ports 103 to 107, inclusive, which register with the ports or bores 98 to 102 of the housing or casing 96. Internally, the liner is provided with a uniform bore 108 centrally of the said liner and with two larger diameter uniform bores 109 and 110 which extend inwardly from each end of said liner, there being conical surfaces at 111 and 112 joining the uniform bores 108 and 109 in one instance and 108 and 110 in a second instance. The conical surfaces, together with the uniform bore 108, function as valve seats. Within the liner are a pair of opposed pistons or plungers 113 and 114. The said pistons are substantially identical of form and, accordingly, the piston 113 will be described, the same features being found in piston 114.

Piston 113 is provided with two cylindrical surfaces of different diameters at 115 and 116, with a conical surface 117 joining surfaces 115 and 116. Cylindrical surfaces 115 and 116 are adapted to fit closely within the bores 109 and 108 of the liner and to assure a fluid-tight fit, portions 115 and 116 are provided with annular grooves 118 and 119. The piston is provided with an inner reduced diameter cylindrical extension 120, and the piston has an axial bore 121 and counterbore 122, to receive an elongated screw 123, the head of the screw being positioned in the counterbore 122. The large base of the piston is provided with an inwardly extending, tapered, threaded bore 124 coaxial with the bore 121, to receive a threaded plug 125.

The piston 114 is provided with an axial threaded bore 126 to receive the end of the screw 123 for the purpose of holding the two pistons in working relationship for simultaneous reciprocation. Means in the form of a spacer disc 127 is interposed between the two piston heads or contiguous ends of said pistons for adjustment purposes and when the two pistons have been secured together, a set screw 128 carried transversely of piston 114 will engage the screw 123 and lock the same against rotation or movement. The plug 125 is not inserted in the bore 125 until after the required adjustment between the piston heads has been made and the set screw locked in position. The plug 125 assists in preventing access of any fuel through the piston in the zone of the screw 123. Coaxial with the bore of the liner L is an elongated cap 192 provided with a base flange 130, the flange being transversely bored for the passage therethrough of screws 131 into tapped openings in the casing 96. The open end of the cap 129 is provided with an annular flange or shoulder 132 which enters the confines of the liner and particularly the enlarged bore portion 109 for assuring that the cap and the said liner are in coaxial alignment. The cap serves as a housing for a master coil spring 133, one end of which bears against the inner surface of the head of the cap, while the opposite end bears against the plunger 113 and urges the plunger to move in one direction normally to the position shown in Figure 2, which is termed the "retarded" position.

The opposite end of casing 96 and of the liner and coaxial with said liner is a stuffing box 134. The stuffing box is flanged and screws are passed through transverse openings of the flange into threaded openings in the casing 96 for securing the box to said casing. The stuffing box, as is usual, is chambered so as to house packing designated generally as 135.

The stuffing box is internally screw-threaded at 136 to receive an externally threaded gland nut 137 which bears against the packing 135. A nut 138 is carried on threads 137 for locking the position of the gland nut. The stuffing box 134 is externally screw-threaded at 139. A cylinder 140 is internally enlarged and threaded, at 141, for engagement with the threads 139. An annular nut 142 is carried on the threads 139 for adjusting the threaded relationship between the cylinder and the stuffing box. Within the cylinder is a piston 143. The inner end of said cylinder is centrally bored at 144 and likewise provided with a reduced diameter bore 145. The bore 145 houses a ball 146, there being an elongated stem 147 passed through the gland nut, the packing, and a stuffing box for engagement with one end of the piston 114, the opposite end of said stem bearing against the ball 146. A cup 148 fits within the confines of the cylinder and bears against the head of the piston. This cup is provided with a central stud 149. The cup may be formed of any material desired, such as a tetrafluoroethylene resin, commonly known in the trade as "Teflon." The cylinder is externally threaded at 150 to receive an internally threaded cap 151, the cap of which is flanged externally and internally concentric with the center of said cap, as shown at 152 and 153, thus providing a central bore at 154 and an enlarged central tapered threaded bore 155 to receive the threaded end of a pipe which communicates with air under pressure, or other fluid, as hereinafter set forth. A coil spring 156 of spiral helical form is interposed between stud 149 and flange 153. As shown, the cylinder is provided with one or more transverse bores 157 to permit viewing the cylinder internally, and particularly the position of the piston in its movement, and to permit air to pass in and out of the cylinder.

The time delay unit 59 is detailed in Figures 3 and 4, and this unit includes a casing or housing 158 provided with a cylindrical bore 159 and counterbore 160 within which counterbore is a liner 161, the internal diameter of the liner and of the bore 159 being the same. The casing is provided with a circular end flange 162 having a flat or plane outer face 163. An elongated cap member 164 is provided at its open end with an annular flange 165, the external diameter of which flange is the same as that of the flange 162. Flange 165 has a plane face 166. The arrangement is such as to provide an internal spacing between end walls 167 and 168 of the body and the cap. The head of the cap is provided with a threaded bore for reception of a threaded plug 169. Adapted to be interposed between the flanges 162 and 165 is a diaphragm 170. The diaphragm is provided on opposite sides with pads 171 and 172. A stem 173 has a reduced threaded pin 174 passed through the pads and the diaphragm, together with a backing washer, with a nut 175 carried on the threaded stem for locking the assembly against the shoulder 176 provided between the stem and the reduced extension 174. The stem is likewise provided with an extended axial pin 177. The cap 164 is adapted to confine a coil spring 178 which bears at one end against the head of the cap and the opposite end against the pad 172.

Within the bore 159 is a timing cam 179 and a piston 180. The timing cam is provided with a central bore 181 and a counterbore 182, the main body of the stem being received within the counterbore while the pin 177 is passed through the bore 181 and into an axial bore 183 in the piston. The timing cam is provided with a conical surface 184, the zone of smallest diameter of which terminates adjacent an annular shoulder 185, the periphery of which substantially has a diameter equal to the internal diameter of the bore 159, while the base end of said conical surface merges with an annular surface 186 fitting within the bore 159. The cup 187 engages the head of the piston, the cup being formed of some wear resistant material, such as a plastic, which may be "Teflon." The body or casing is threaded at 188 to receive an internally threaded cap 189, the cap being formed to centrally receive the threaded end of a pipe leading to a source of air or other fluid under pressure, as hereinafter set forth in the statement of operation. Between the cap and the cup 187 is a coil spring 190, which functions as a retainer spring, while the spring 178 is designated as the master spring. Secured to the top of the body or casing is an adjustable pad 191 by means of screws, designated generally as 192, which are received in tapped openings in the said casing, and carried on the adjustable pad, is a micro-switch 193. The casing and the pad 191 are transversely bored at 194 to accommodate the microswitch plunger 195. The casing is provided with a reduced diameter bore 196 coaxial with bore 194, and within this bore is received for free movement pin 197, one end of which engages the end of the plunger 195 of the micro-switch and the other end of which pin engages the beveled surface of the timing cam. The screws 192 allow for raising or lowering of the pad 191 and the micro-switch 193. This allows for adjustment of the range of movement of the timing cam to raise and to lower the pin 197 to actuate the micro-switch 195.

A metering valve assembly, designated generally as 198, is shown in Figure 4, and this assembly is secured to cap 165. The cap is provided with an external boss 199 which is internally screwthreaded at 200 to receive a threaded extension 201 of casing 202. A washer is provided between the end of the casing and the external surface of the boss to provide a fluid-tight engagement therebetween, as shown at 203. The casing is provided with a transverse threaded bore 204 to receive an externally threaded packing box 205, which packing box is internally threaded at 206, and confines packing 207 engaged by a gland nut 208, the gland nut having threaded engagement with the threads 206. An externally threaded metering valve stem 209 is passed through said gland nut, the packing box, and in threaded engagement with the box, the said stem having an end extension having a tapered grooved portion 210, the extension otherwise being circular. This extension is received within a bore 211 which is co-axial with the axis of the stem and that portion of the stem extension which is not provided with the tapered groove and fits tightly within said bore when in one position. The arrangement is such that a port or bore 212 in said casing permits communication between the interior of cap 164 and the upper end of bore 211, at 213, while the opposite end of said bore is in communication with a port 214 leading to an enlarged threaded transverse opening 215, which receives a pipe 216, the said pipe being in communication with a small reservoir, not shown in Figure 4 but indicated in Figure 1.

In Figure 5, we have shown, in section, a filter relief valve which may be utilized in the practice of the invention, the same including a body or casing 217, the interior of which is threaded at 218 to receive the externally threaded end 219 of a fitting 220. The fitting is externally threaded, at 221, for engagement with the threaded interior of a cap 222. Within the casing and surrounded in part by the fitting 220 is a cylindrical core member 223 having a conical valve head 224. The conical valve head is adapted to be in part received within or raised from an opening 225 in the casing 217, an edge bounding said opening functioning as a valve seat. Interposed between the said conical valve head and surrounding the core, is a coil spring 226, with one end of said spring engaging an end of an annular adjusting screw 227. This adjusting screw is externally threaded for engagement with the internal threads 228 of the fitting 220, the core otherwise being received within the said adjusting screw, as shown. A lock nut 229 is carried on the threads of the adjusting screw for holding the said screw in any selected position and thereby regulating compression of the spring 226, and hence opening movement of the valve head from its valve seat. A port at 230 permits entrance within the confines of the body or casing.

Reference is again made to Figure 1. The pipe 55 leads to a source of air or other fluid under pressure, and is primarily directed from said source through an air inlet strainer 56 of any type, such as the Norgren type O–552. After leaving the air inlet strainer 56, the air is divided into two paths, as shown at 231 and 232, path 231 being controlled as to passage of air by the solenoid-operated valve 58 while path 232 is controlled as to passage of air by the solenoid valve 57. Solenoid valves are common in the art, and the valve is opened when the solenoid is energized, and closed when de-energized. Such controls are available through General Controls Company, being its Catalogue type PV–11 B1309, by way of example. After passage of the air from line 232 through solenoid valve 57, the line connects with piping 233. This piping, in turn, leads in one instance, to the time delay unit shown in Figure 3, and connects also with fuel valve No. 1, shown at 33. See, also, Figure 2. The line 231 after passage through the solenoid valve at 58 connects with fuel valve No. 2, shown at 35, the connection being the same as shown for line 233, in Figure 2. In Figure 1, it will be observed that pipe 47, after communicating with relief valve 48 is in communication with bore 101 of the fuel valve 33. Pipe 34 communicates with bore 100. In the case of the two bleeder ports, bore 99 through pipe 234 is in communication with pipe 1 for fuel valve No. 1, shown at 33, and by means of a pipe 235 with pipe 1 for the No. 2 fuel valve at 35. A pipe 236 leads from bore 102, which is a bleeder port for each fuel valve, the said pipe being connected to pipe 47. In the case of the fuel valve shown at 33, the bleeder port is in connection with pipe 236 through pipe 237. As shown, pipe 45 leads to the distillate fuel tank.

The filters 43 in the distillate fuel line from the distillate tank may be of any type, and usually follow the specifications of the particular Diesel engine builder. We have found, however, that filters of the string-wound type, sintered bronze or cartridge types, or a combination of said types, are satisfactory. The primary filter, shown at 16, is usually of the waste pack filter type, while the final filters at 23 and 24 may be of resin impregnated paper, cotton waste, or other filtering media which will readily remove 15 to 25 micron particles.

For convenience, in the statement of the operation, and in describing an embodiment of the invention in actual practice, the several relief valves, shown in Figure 1, are designated as to their opening pressure per square inch.

The operation, use and advantage of the invention just described, are as follows:

In considering the system and means disclosed, certain essentials for its proper operation must be observed. First, in the dual fuel system, the engine must be supplied with a high grade fuel, such as a distillate, during starting and light load conditions, with an automatic switching to a low grade or residual fuel during high speed and high load conditions, thereafter returning to the high grade fuel as the engine is slowed to a speed unsuitable for economical fuel consumption. Ordinarily, the average diesel locomotive has a throttle so arranged as to have eight (8) positions, the first four (4) positions of which might be considered as starting and light load, the engine probably generating around 400 horsepower. From the fourth to the fifth position, the dual fuel system makes a change from the distillate or high grade fuel to the low grade or residual fuel, and continues to use residual fuel for the remaining positions, including number eight. In order to use a residual fuel which has a high viscosity, the fuel must be kept hot in order that it might be pumped and filtered with ease. The average diesel engine will not run on residual fuel satisfactorily and without considerable damage to the engine when the throttle is in positions one to four, nor will the engine idle. It is of utmost importance to guard against fouling during the change from residual fuel to distillate or high grade fuel that there is a proper purging of the injector manifolds of the engine, and the intermediate feed lines of all residual fuel. There are times when it is not economically feasible to use residual fuels, even if the engine is running very rapidly, such as during yard switching in the case of locomotive diesel engines; also docking, entering or leaving locks, etc., for marine diesel engines. The present invention is so constituted that even for fully automatic operation, these periods must be anticipated and change over to residual fuel guarded against by the controlling mechanism. Manual overrides for emergency and checking purposes are, therefore, provided in the present system.

The heavy fuel circulating system includes a pair of pipes 4 and 5 which connect with the tank holding the residual fuel with the circulating pump motor 7 and the heavy fuel pump motor 8 driving said fuel into the heat exchangers 10 and 12. In the case of the motor driven pump 7, the residual fuel, after passing through the heat exchanger 10, returns through pipe 6 to the residual fuel tank, while in the case of the motor driven fuel pump shown at 8, the residual fuel is directed into the heat exchanger 12, and thence through pipe 17 into the primary filter. It is to be observed that the two heat exchangers 10 and 12, together with the primary filter, and the final filters at 23 and 24, are positioned within the tank 13 which receives hot water from the engine jacket through pipe 14 and outwardly through exit 15 for return circulation, to wit, to the expansion tank. Hence, it is evident, in one instance, that the heat exchanger 10 is directing the residual fuel in a circuitous path to the residual tank for the purpose of at all times maintaining the residual fuel at a selected temperature, thus keeping the residual fuel at a viscosity suitable for ready handling. So far as the motor driven pump 8 is concerned, it forces the heated residual fuel through the heat exchanger 12 and into the primary filter 16, which is a coarse filter for removing deleterious substances in the residual fuel, such as sulphur particles, and other abrasive particles, then directing the filtered residual fuel to a valve 22, which valve may be turned to make a selection of filters 23 or 24. These are known as final filters, and are for the further removal of particles from the residual fuel. It is also evident that if, say, the filter at 23 becomes clogged and creates a back pressure, that the valve 22 may be turned so as to direct the residual fuel through the second filter 24, followed by replacement of the filter 23. From either filter 23 or 24, residual oil is directed through the heat exchanger 28 and thence through pipe 30 to fuel valve No. 1, shown at 33. The relief valve at 20 is set at 40 p.s.i. so that if excessive back pressure occurs in the primary filter above the 40 p.s.i., the valve will open and allow the residual fuel to directly enter pipe 19. However, the pressure gage at 21 which operates at 160 p.s.i. will give an indication of the back pressure caused by the filter 16 so that the filter can be replaced. Ordinarily, the residual oil, which is directed to the fuel valve 33 through pipe 34, will build up a pressure, particularly if the valve is closed to passage of residual oil and when the oil pressure exceeds 30 p.s.i., the relief valve at 31 will open and the residual oil will be directed into pipe 1 and returned to the heavy fuel tank.

The distillate or light fuel is directed from the light fuel tank past the check valve 40, through the strainer 41 by pump 42, thence through filters at 43, pipe 49, to the No. 1 fuel valve shown at 33. Likewise, there is a connection 45 between the outlet from the pump 42 and the filters 43 to a relief valve 46 which opens at 45 p.s.i. with a return to the distillate fuel tank. There is also a return 47 past the relief valve 48, which opens at 30 p.s.i. to the line 45 leading to the tank. Thus, if distillate is unable to enter fuel valve 33, under the pump pressure, this distillate will return past the relief valve 48 into the line leading to the distillate tank, this for the reason that the relief valve at 46 will only open at 45 p.s.i. which is 15 p.s.i. higher than the setting of relief valve 48.

The Nos. 1 and 2 fuel valves, shown at 33 and 35, as well as the time delay unit at 59, are brought into operation through the medium of air under pressure, the air under pressure being directed in certain paths to said fuel valves and time delay unit in accordance with the operation of solenoid valves 1 and 2, shown at 57 and 58, these respective solenoid valves acting as pilot valves.

When the coils within tubes 73 and 73ª are energized, the thermostatic switch arms gradually close after a given time delay. These particular tubes are in parallel to assure the operation of one or the other or both thereof at all times. The intermediate tube 71, between the tubes 73 and 73ª, has its switch element 85 controlled magnetically through the magnetic coil therein, and when the electrical system is in operation, assuming that the switch at 69 is placed on contact 70 for automatic operation, distillate will be directed to the fuel valve 33, which constitutes the inlet fuel selector valve. This valve will be in the position shown in Figure 2, which is to say, piston 114 is moved so as to allow communication between ports 103 and 106, thence through the piping 51 to the return fuel selector valve at 35. It will be observed that pipe 51 leads to the engine header or manifold, as does pipe 54, and while the direction of movement of the fuel oil is in one direction, as indicated by the arrow at the end of pipe 51, the fuel oil is allowed to move in one of two directions so far as pipe 54 is concerned; the pipe likewise leads to the engine header or manifold. We are assuming, of course, that the engine is either idling or the engine throttle has not been moved beyond position 4. When position 4 is passed, the switch on the engine governor is closed and the transition from the use of distillate fuel to that of residual fuel takes place.

To review briefly, the distillate fuel is passed through fuel valves 33 and 35 or, as these valves have been designated, the inlet and return fuel selector valves, to the engine manifold or header, and distillate fuel not used by the engine is returned through relief valve 48 to the inlet or suction side of pump 42 or, in certain instances, to the distillate tank. When throttle position 5 or higher is made during a time interval of, say, 60 seconds, the electrical circuit to the time delay tubes 73 and 73a is energized, and the heating coils or filaments therein will heat the thermostatic switch elements in said tubes and finally close said switch elements. After an approximate time delay of 60 seconds, a closing of the switch elements of said time delay tubes 73 and 73a causes the electrical energizing of the relay R, removing the time delay tubes from the circuit and energizing solenoid valve 57 and likewise energizing the indicator light 78. The solenoid valve 57, upon being energized, permits air under pressure to pass therethrough into fuel valve No. 1, shown at 33, and likewise into the time delay unit 59. A closing of the time delay unit at 59 energizes solenoid valve No. 2, shown at 58, and passes air under pressure into fuel valve No. 2, shown at 35, this latter valve moving to heavy fuel oil position. This places the engine in heavy fuel operation with unused heavy fuel returning to the heavy fuel tank.

Reference is made to Figure 2. When air under pressure enters the cylinder 140 through pipe 233, the piston 143 is moved to the left of the showing, which movement will push stem 147 and move the plunger or piston 114 to the left, and at the same time, move the piston 113 to compress the master spring 133. During such movement, piston 114 and specifically the portion 116 will enter the uniform bore portion 108 and close passage between ports 106 and 103. This occurs when the piston or pistons have moved about 30% of total movement. As the pistons 113 and 114 continue movement, the portion 116 of piston 113 emerges from the uniform bore 108 and a conical portion of each piston moves relative to its conical seat. In the case of piston 114, it tends to close against its conical seat while piston 113 opens to permit passage through port 105 around the piston into port 103 for residual oil. All distillate oil flow has been stopped. This particular valve is constructed to operate at temperatures from zero to 300° F., with a minimum of friction and a maximum of sealing, and will handle fluctuating pressures efficiently.

In the case of the time delay unit, air under pressure enters through pipe 233 into the cylinder to move the piston 180 to the left of the showing of Figure 3. This time delay unit incorporates a metering valve on one side of the diaphragm 170. Thus, it is intended that the cap 164 at one side of the diaphragm should be filled with oil and that when the diaphragm is moved in one direction, pressure is exerted against the oil to force the same through port 212, the metering valve and into pipe 216, which is in direct connection with a small reservoir holding the oil supply. The diaphragm is moved against pressure of the master spring 178 and when movement against the diaphragm to compress the master spring and exert pressure on the oil is relieved, the spring expands to move the diaphragm to its original position and, at the same time, oil is drawn through the metering valve back into the cap 164. A raising or lowering of the metering valve stem regulates the rate of flow of the oil and thereby regulates the timing. Hence, as air under pressure enters the cylinder to move the piston 180, the piston, through stem 173, moves the diaphragm to the left of the showing in Figure 3 to compress the oil within the cap 164. During this movement of the piston, the timing cam 179 is moved and the pin or plunger 197 is moved on the inclined or conical surface of the timing cam to raise the same and thus actuate the micro switch plunger 195 to close the micro switch. This closing of the micro switch electrically actuates the solenoid valve at 58, which is termed a pilot valve and allows air under pressure to pass into fuel selector valve 35.

We assume now that the operator or engineer desires to return the throttle position to 4 or lower. During a time interval of, say, 55 seconds, the time interval being previously determined, electrical current is immediately cut to the time delay tube unit, which deenergizes the solenoid valve 57, as well as deenergizing the indicator light 78. Air is exhausted from fuel valve 33 to the atmosphere and the pistons 113 and 114 are moved under pressure of the master spring 133 to the position shown in Figure 2. The heavy fuel passageway through port 105 is closed, and the light fuel port 106 is opened. The time delay unit 59 is deenergized in that the air is exhausted from the cylinder, and the master spring 178 moves the piston 180 and the timing cam 179 to the position shown in Figure 3, which opens the micro switch 193. The deenergizing of the time delay unit starts the 55 second timing for the cleaning operation, because the oil must again pass the metering stem 209 from its reservoir into the cap 164 and if the metering stem is properly adjusted, this will require approximately 55 seconds time for the opening of the micro switch. As a result, residual fuel from the manifold is returned to the heavy fuel tank through pipe 1. At the end of the 55 seconds, as stated, the time delay unit opens, deenergizing solenoid valve 58 and air is released from fuel valve 35. The fuel valve 35 returns to normal distillate position, which is the position shown in Figure 2.

During the transition from heavy or residual fuel to lighter or distillate fuel, a so-called purging cycle occurs, in that the residual fuel which may remain in the engine header is flushed out with distillate fuel; this residual fuel, together with the distillate fuel required to flush the engine header, although small in amount, will be directed to the heavy or residual fuel tank.

As described, the switch 69 has been in the automatic position and the system operates as has just been set forth. However, if only distillate fuel is desired to be used, regardless of the engine speed or load, the switch may be moved to the light fuel contact at 71, and this position will keep all of the valves in light fuel operation regardless of throttle position. The heavy position, or the position shown at 72, keeps the selector valves in heavy fuel position. The switch at 88 permits either time delay action or the removal of the same while testing the control panel. The indicator light at 78 is provided to show when heavy fuel is being supplied to the engine manifold or header. This light is extinguished when the engine is operated on light fuel.

In order that there shall be no misunderstanding as to the operation of the system, a brief resume is made. The two valves 33 and 35 are for the purpose of handling the light and heavy fuels. Specifically, the fuel valve 33 functions as the inlet fuel selector valve for both the distillate fuel and the residual fuel, while the valve 35 functions as the return fuel selector valve for either the distillate fuel or the residual fuel. Both of these valves 33 and 35 are actuated by air under pressure and the pressure air is controlled as to movement by the solenoid valves 57 and 58. The electric solenoid valves are used as pilot valves and the piping is such that when one or the other of the solenoid valves, or both thereof, are energized, air under pressure is admitted to a fuel valve 33 or 35, or both. When a solenoid valve is deenergized, air is released therefrom and a fuel valve becomes deenergized. The solenoid and fuel valves are paired together. Thus, No. 1 solenoid valve 57 and No. 1 fuel valve 33 are paired, in that No. 1 solenoid valve operates to move the piston in No. 1 fuel valve, while No. 2 solenoid valve 58 controls operation of No. 2 fuel valve 35. The No. 1 fuel valve, shown at 33, controls which fuel, whether residual or distillate, is being directed to the engine manifold or header. The No. 2 fuel valve, shown at 35, controls the unused fuel returning from the engine manifold or header, and makes it possible to purge the manifold and lines upon the return to light fuel. Therefore, if solenoid valve No. 1 is deenergized, the engine is using distillate or light fuel. If the solenoid valve No. 1 is energized, then the engine is using residual or heavy fuel. If solenoid valve No. 2 is deenergized, the unused fuel in the engine manifold is being returned to the light fuel tank, and if solenoid valve No. 2 is energized, the unused residual fuel is returned to the residual fuel tank. The time delay unit 59 is located between solenoid valves 1 and 2, shown at 57 and 58, and is for the purpose of assuring the purging of residual or heavy fuel from the manifold and in the lines on return to distillate or light fuel service. When the solenoid valve 1, shown at 57, is energized, fuel valve No. 1, shown at 33, is moved so that heavy oil or residual oil is directed to the engine. The time delay unit 59 is then operated so that solenoid valve 58 is opened and fuel valve 35 is moved so that unused fuel is directed back to the residual fuel tank. When solenoid valve 57 is deenergized, the fuel valve 33 directs light or distillate fuel to the engine, and the time delay unit 59 moves in a reverse direction, or to the position shown in Figure 3. A time delay takes place and solenoid valve 58 continues to direct the light fuel returning from the engine, together with the residual fuel ahead of it, back to the residual fuel tank. This is called the purging cycle. After all residual and mixed fuel is cleaned from the manifold, and clear distillate fuel is visible in the sight glass 52, the timing of the delay unit 59 has run out. Solenoid valve 58 is deenergized and fuel valve 35 then directs the unused fuel to the distillate fuel tank. At this point, the control panel is in its normal position and the engine is on distillate or light fuel. The electrical energy used to operate the solenoid valves is obtained from the battery circuit of the power unit, and is coupled to the control panel through the automatic switch or relay units so that when heavy or residual fuel is desired, voltage is present at the control panel. If this electricity is allowed to pass through the electrical panel, solenoid valve 57 would be energized and light 78 would glow. It is undesirable to change to heavy fuel and cycle the controls unless it is intended to stay on heavy or residual fuel for some time. To prevent this unnecessary cycling, the time delay unit is placed between a terminal and the solenoid valve 57. The time delay unit is arranged in such a way that a predetermined period elapses from the time the voltage is admitted through a terminal until it is passed to solenoid valve 57. This timing is for a long enough period to enable the use of high throttle settings for short periods without the change over to heavy fuel. The selector switch arrangement shown at 88, 89 and 90 is provided to lock the controls in any desired position so as to by-pass the time delay unit in case the said unit should fail, or if operation is such that said unit is undesirable. We may also provide a so-called purging button for the switch at 93 which is connected across the time delay unit to make it possible to manually purge the manifold and to check fuel valve 35 as to operation. The indicator light at 78 shows which fuel is being used and when "On" heavy fuel is used, and when "Off" light fuel is used. By-pass relief valves are employed in each fuel system to give a by-pass route for the fuel not in use.

The operation previously set forth describes an operation or system that functions as a full circulating system during heavy fuel operation and as a dead-ended system during light fuel operation. This means that, when heavy fuel is being supplied to the engine, the heavy fuel circulates continuously through the engine injector manifold and is continuously being returned to the heavy fuel supply tank. When light fuel is being supplied to the engine, the injector manifold or header is "dead-ended" so that no fuel returns to the light fuel tank. On some Diesel engines, it is desirable to employ a full circulating system on both light and heavy fuel operation. This is accomplished by connecting pipe 53 to the light fuel tank instead of to pipe 51. In all other respects, the system would remain the same. In cases where engine design requires pressurized manifolds, an orifice or pressure relief valve 36 is added to the heavy fuel return line on the down-stream side of fuel valve 35 and is used, together with the aforementioned dead-end light fuel connection. This adaptation would also apply to Diesel engines designed with a non-circulating or dead-end fuel system.

We claim:

1. Fuel control mechanism for selectively controlling the feeding of two dissimilar fuels from separate fuel supply tanks to an engine manifold, including: a pair of three-way valves, a first of said valves having two inlet ports and a single outlet port, the second of said valves having a single inlet port and two outlet ports, means flow connecting one outlet port of the second valve with the outlet port of the first valve, the first valve inlet ports being separately connected with the supply tanks for the two fuels, the inlet port of the second valve being flow connected to the engine manifold, the other outlet port of the second valve discharging into the supply tank for one of the fuels, and means responsive to changes in the load and speed of said engine to shift the positions of the pair of valves to change from one fuel to a second fuel and to prevent contamination between the fuels of at least one of said fuels.

2. A dual fuel system for suplying two dissimilar fuels to a Diesel engine comprising automatic means for switching from one fuel to a second fuel and vice versa at a preselected load and speed of said Diesel engine, and means for purging the fuel supplied to the engine prior to supplying a second fuel to prevent contamination between the fuels.

3. A dual supply fuel system for supplying two dissimilar fuels to a Diesel engine, comprising means automatically changing the fuel supply to said engine from a first of said fuels to a second of said fuels at a predetermined load and speed of said engine, and time delay means controlling the first named means when the second of said fuels is to be discontinued and the first of said fuels supplied.

4. A fuel system for supplying two dissimilar fuels to the manifold of a diesel engine, comprising: an inlet fuel selector valve and a return fuel selector valve, the inlet fuel selector valve provided with two inlet ports and one outlet port, the inlet ports of the inlet fuel selector valve being separately connected to the sources of supply of the dissimilar fuels, said return fuel selector valve provided with two outlet ports and one inlet port, the outlet port of the inlet fuel selector valve being connected with one outlet port of the return fuel selector valve and likewise to the engine manifold, the other outlet port of the return fuel selector valve being connected to one source of supply of a dissimilar fuel and time delay means for maintaining the return fuel selector valve in a given position to permit purging of a fuel from the engine manifold.

5. A fuel system for supplying two dissimilar fuels to a diesel engine such as a light fuel and a heavy fuel, comprising an inlet fuel selector valve for controlling the passage therethrough to said engine of either the light or the heavy fuel, a return fuel selector valve controlling the disposition of the return of any excess of fuel not consumed by said diesel engine, said inlet fuel selector valve moving from light fuel supply position to heavy fuel supply position and vice versa at a preselected load and speed of said diesel engine, and time delay means controlling operation of the return fuel selector valve to hold the said valve in heavy fuel position before returning to light fuel position to permit the heavy fuel to be purged from said diesel engine before the return fuel selector valve position changes to light fuel position.

6. A fuel system for supplying two dissimilar fuels to a diesel engine manifold, such as a light fuel and a heavy fuel, comprising means for constantly circulating and heating a source of heavy fuel to lower its viscosity, and means for constantly supplying light fuel from a source under pressure, a three-way inlet fuel selector valve having two inlet ports and a single outlet port, and a connection between the source of light fuel with one of said ports and a connection between the source of heated heavy fuel and the other of said ports, the outlet of said inlet fuel selector valve leading to the manifold of said diesel engine; a return fuel selector valve having a single inlet port leading from the engine manifold and two separate outlet ports, the outlet port of said inlet fuel selector valve being in connection with one of the outlet ports of said return fuel selector valve, the other of said ports of said return fuel selector valve being in connection with the source of supply of heavy fuel, and automatic means for shifting the inlet fuel selector valve from light fuel to heavy fuel responsive to a preselected speed and load on said engine.

7. A fuel system for supplying two dissimilar fuels to a diesel engine manifold, such as a light fuel and a heavy fuel, comprising means for constantly circulating and heating a source of heavy fuel to lower its viscosity, and means for constantly supplying light fuel from a source under pressure, a three-way inlet fuel selector valve having two inlet ports and a single outlet port, and a connection between the source of light fuel with one of said inlet ports and a connection between the source of heated heavy fuel and the other of said inlet ports, the outlet port of said inlet fuel selector valve leading to the manifold of said diesel engine; a return fuel selector valve having a single inlet port leading from the engine manifold and two separate outlet ports, the outlet port of said inlet fuel selector valve being in connection with one of the outlet ports of said return fuel selector valve, the other of said outlet ports of said return fuel selector valve being in connection with the source of supply of heavy fuel, automatic means for shifting the inlet fuel selector valve from light fuel to heavy fuel responsive to a preselected speed and load on said engine, and time delay means for operating the return fuel selector valve to permit circulation from the engine manifold of said heavy fuel back to its source of supply.

8. A fuel system for supplying two dissimilar fuels to a Diesel engine manifold, such as a light fuel and a heavy fuel, comprising means for constantly circulating and heating a source of heavy fuel to lower its viscosity, and means for constantly supplying light fuel from a source under pressure, a three-way inlet fuel selector valve having two inlet ports and a single outlet port, and a connection between the source of light fuel with one of said inlet ports and a connection between the source of heated heavy fuel and the other of said inlet ports, the outlet port of said inlet fuel selector valve leading to the manifold of said Diesel engine; a return fuel selector valve having a single inlet port leading from the engine manifold and two separate outlet ports, the outlet port of said inlet fuel selector valve being in connection with one of the outlet ports of said return fuel selector valve, the other of said outlet ports of said return fuel selector valve being in connection with the source of supply of heavy fuel, and time delay means for maintaining the return fuel selector valve in heavy fuel position for a time interval, the inlet fuel selector valve being in light fuel position to thereby purge the manifold of residual fuel back to the residual fuel source of supply.

9. A fuel supply system for supplying two dissimilar fuels to a Diesel engine, such as a light fuel and a heavy fuel, comprising means for supplying the light fuel to said engine for idling and light load conditions, means for supplying to said engine the heavy fuel at predetermined load change on said engine, and means preventing the consumption of mixed fuels by the engine during changeover from heavy fuel to light fuel.

10. A fuel system for Diesel engines as disclosed, including a heavy fuel tank having an inlet and an outlet and adapted to hold heavy fuel, a second tank in connection with the Diesel engine for conducting engine heat thereto, a heat exchanger within said second tank and in pressure connection with the inlet and outlet of said heavy fuel tank, a second heat exchanger within said second tank, and in pressure connection with the heavy fuel tank, and filter units within the second tank and with the second heat exchanger, with a return circuit to the heavy fuel tank and to said Diesel engine.

11. A fuel system for Diesel engines as disclosed, including a heavy fuel tank having an inlet and an outlet and adapted to hold heavy fuel, a second tank in connection with the Diesel engine for conducting engine heat thereto, a heat exchanger within said second tank and in pressure connection with the inlet and outlet of said heavy fuel tank, a second heat exchanger within said second tank, and in pressure connection with the heavy fuel tank, filter units within the second tank and with the second heat exchanger, with a return circuit to the heavy fuel tank and to said Diesel engine, and means for directing heavy fuel from the filter units to an inlet fuel selector valve to the Diesel engine and a return fuel selector valve for directing said heavy fuel to the heavy fuel tank.

12. A fuel system for supplying two dissimilar fuels to the manifold of a Diesel engine, means for supplying one of said two fuels to said manifold, means for automatically changing from the first to the second of said two fuels and vice versa, at a predetermined speed or load of said Diesel engine, and means rendering said automatic means ineffective whereby one or the other of said two fuels may be selectively and instantaneously supplied to the manifold of said engine at all engine speeds and loads.

13. A system for supplying two dissimilar fuels to a Diesel engine, comprising electrical time delay means operative in accordance with predetermined engine speed and load, an electrical relay adapted to be closed after a time interval by the electrical time delay means, an inlet fuel selector valve for controlling the passage therethrough of either of said fuels, a return fuel selector valve for said fuels, one of said fuels being dead-ended at said return fuel selector valve when the other of said fuels is passing therethrough, electro-pneumatic solenoid valves in circuit with said electrical relay for controlling pressure fluid to said inlet and return fuel selector valves to move the same, and a time delay unit controlling operation of the electro-pneumatic solenoid valve supplying pressure fluid to the return fuel selector valve.

14. The device as set forth in claim 13, characterized in that deenergizing the electrical circuit to the electric relay consequent upon engine load and speed, opening said relay, and releasing pressure fluid from the inlet fuel selector valve to move the same to a position for passage of one of said fuels, the circuit to the time delay unit being maintained for a time interval, followed by the second electro-pneumatic solenoid valve being deenergized and for shifting the position of the return fuel selector valve to receive the fuel passing through said inlet fuel selector valve.

15. A dual fuel system for Diesel engines, the engine having a manifold provided with an inlet and an outlet for fuel, comprising: a pair of valves, each including a movable valve member, means of connection between a first of said valves with the inlet of said manifold, and means of connection between the outlet of said manifold with the second of said valves, and means of connection between the second valve and a source of supply for one fuel, separate means of connection with the first of said valves with each source of fuel supply, whereby when the movable valve member in the first and the second of said valves is in one position, one of said fuels is directed through the first of said valves to the manifold inlet, the second of said valves directing the fuel from the outlet of said manifold back to the source of supply of said fuel.

16. A dual fuel system for Diesel engines, the engine having a manifold provided with an inlet and an outlet for fuel, comprising: a pair of valves, each including a movable member, means of connection between a first of said valves with the inlet of said manifold, and means of connection between the outlet of said manifold with the second of said valves, and means of connection between the second valve and a source of supply for one fuel, separate means of connection with the first of said valves with each source of fuel supply, whereby when the movable valve member in the first and the second of said valves is in one position, one of said fuels is directed through the first of said valves to the manifold inlet, the second of said valves directing the fuel from the outlet of said manifold back to the source of supply of said fuel, and the first and second of said valves, when the movable valve members are in a second position, both directing the other of said fuels to the inlet of the manifold.

17. A dual fuel system for Diesel engines, the engine having a manifold provided with an inlet and an outlet for fuel, comprising: A pair of valves, each including a movable member, means of connection between a first of said valves with the inlet of said manifold, and means of connection between the outlet of said manifold with the second of said valves, and means of connection between the second valve and a source of supply for one fuel, separate means of connection with the first of said valves with each source of fuel supply, whereby when the movable valve member in the first and the second of said valves is in one position, one of said fuels is directed through the first of said valves to the manifold inlet, the second of said valves directing the fuel from the outlet of said manifold back to the source of supply of said fuel, the first and second of said valves, when the movable valve members are in a second position, both directing the other of said fuels to the inlet of the manifold, and automatic means for controlling the position of each movable valve member in accordance with engine speed and load.

18. A dual fuel system for supplying two dissimilar fuels such as a heavy and a light fuel to a Diesel engine manifold, comprising: automatic means for switching from heavy fuel to light fuel and vice versa, at a preselected load and speed of said Diesel engine, and means for automatically purging the heavy fuel supplied to the engine manifold prior to supplying light fuel to prevent contamination in the engine manifold between the fuels.

References Cited in the file of this patent

UNITED STATES PATENTS

| | | |
|---|---|---|
| 1,105,016 | Bassford | July 28, 1914 |
| 2,758,579 | Pinotti | Aug. 14, 1956 |